United States Patent
Schilling et al.

(10) Patent No.: US 11,946,168 B2
(45) Date of Patent: Apr. 2, 2024

(54) SPINNABLE COMPOSITION (SC), AND POLYESTER FIBERS (PF) MADE THEREFROM

(71) Applicant: BASF SE, Ludwigshafen am Rhein (DE)

(72) Inventors: Daniel Schilling, Ludwigshafen am Rhein (DE); Klaus Scheuermann, Ludwigshafen am Rhein (DE); Jerome Lohmann, Ludwigshafen am Rhein (DE); Gijsbrecht Jacobus Maria Habraken, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 295 days.

(21) Appl. No.: 17/431,264

(22) PCT Filed: Feb. 4, 2020

(86) PCT No.: PCT/EP2020/052770
§ 371 (c)(1),
(2) Date: Aug. 16, 2021

(87) PCT Pub. No.: WO2020/164976
PCT Pub. Date: Aug. 20, 2020

(65) Prior Publication Data
US 2022/0127759 A1   Apr. 28, 2022

(30) Foreign Application Priority Data
Feb. 14, 2019   (EP) .................................. 19157275

(51) Int. Cl.
*D01D 1/02*   (2006.01)
*C08L 67/03*   (2006.01)
*D01F 6/92*   (2006.01)
*D06P 3/52*   (2006.01)

(52) U.S. Cl.
CPC .............. *D01F 6/92* (2013.01); *C08L 67/03* (2013.01); *D01D 1/02* (2013.01); *D06P 3/52* (2013.01); *C08L 2203/12* (2013.01); *C08L 2205/02* (2013.01)

(58) Field of Classification Search
CPC ... D01F 6/92; D01F 8/14; C08L 67/03; C08L 2203/12; C08L 2205/02; C08L 67/02; D01D 1/02; D06P 3/52

USPC .............................................................. 8/497
See application file for complete search history.

(56) References Cited

U.S. PATENT DOCUMENTS 3,328,484 A * 6/1967 Allard ..................... C08L 67/02
525/425
8,785,548 B2   7/2014 Klots et al.

FOREIGN PATENT DOCUMENTS

| CN | 102164984 A | 8/2011 | |
| CN | 102471942 A | 5/2012 | |
| EP | 2824145 A1 | 1/2015 | |
| WO | 2010/034710 A1 | 4/2010 | |
| WO | 2011/012598 A1 | 2/2011 | |
| WO | WO 2015192932 A1 * | 12/2015 | ............... D01F 6/92 |
| WO | 2018/219714 A1 | 12/2018 | |
| WO | WO 2018219714 A1 * | 12/2018 | ............... D01F 6/92 |

OTHER PUBLICATIONS

International Search Report and Written Opinion received for PCT Patent Application No. PCT/EP2020/052770, dated Mar. 2, 2020, 8 pages.
International Preliminary Report on Patentability received for PCT Patent Application No. PCT/EP2020/052770, dated Aug. 26, 2021, 7 pages.

* cited by examiner

*Primary Examiner* — Eisa B Elhilo
(74) *Attorney, Agent, or Firm* — Faegre Drinker Biddle & Reath LLP

(57) ABSTRACT

The present invention relates to a process for the preparation of a spinnable composition (sC) by mixing at least one terephthalate polyester (A), at least one aliphatic-aromatic polyester (B), at least one oligomer (C) and optionally at least one additive (D). Moreover, the present invention relates to the spinnable composition (sC) obtained by this process, a process for the preparation of polyester fibers (PF) by extruding the spinnable composition (sC) through at least one spinneret, the polyester fibers (PF) obtained by this process, textile materials (T) comprising the polyester fibers (PF) a process for dying the textile materials (T), and the use of the oligomer (C) for the improvement of the rheology and/or the dyeability of a composition comprising at least one terephthalate polyester (A) and at least one aliphatic aromatic polyester (B).

12 Claims, No Drawings

SPINNABLE COMPOSITION (SC), AND POLYESTER FIBERS (PF) MADE THEREFROM

CROSS-REFERENCE TO RELATED APPLICATIONS

This application is a national stage application (under 35 U.S.C. § 371) of PCT/EP2020/052770, filed Feb. 4, 2020, which claims benefit of European Application No. 19157275.9, filed Feb. 14, 2019, both of which are incorporated herein by reference in their entirety.

The present invention relates to a process for the preparation of a spinnable composition (sC) by mixing at least one terephthalate polyester (A), at least one aliphatic-aromatic polyester (B), at least one oligomer (C) and optionally at least one additive (D). Moreover, the present invention relates to the spinnable composition (sC) obtained by this process, a process for the preparation of polyester fibers (PF) by extruding the spinnable composition (sC) through at least one spinneret, the polyester fibers (PF) obtained by this process, textile materials (T) comprising the polyester fibers (PF) a process for dying the textile materials (T), and the use of the oligomer (C) for the improvement of the rheology and/or the dyeability of a composition comprising at least one terephthalate polyester (A) and at least one aliphatic aromatic polyester (B).

Polyesters are generally polymers having ester functions —[—CO—O—]— in their main chain. They are typically prepared by ring-opening polymerization of lactones or by polycondensation of hydroxycarboxylic acids or of diols and dicarboxylic acids/dicarboxylic acid derivatives. Of particular importance are the aromatic polyesters which, in the form of polyester fibers, find use in the textile industry.

Polyester fibers are typically produced by the melt spinning method. Heating gives rise to a melt which is extruded through spinnerets to obtain the polyester fibers. Since the polymer mixture from which the polyester fibers are produced generally comprises polyethylene terephthalate (PET), polytrimethylene terephthalate (PTT) and/or polybutylene terephthalate (PBT), the melt spinning process is generally conducted at very high temperatures.

In the melt spinning method the temperature of the melt must be sufficiently above the melting point of the polyester that is spun. If the temperature of the melt is to low the flow rate of the melt which is extruded through the spinnerets is low and the spinnerets can clog up. A higher temperature of the melt leads to an improved flow rate of the melt which is extruded through the spinnerets and, therefore, to a higher throughput and a faster production of the polyester fibers. However, if the temperature of the melt is too high the polyester fibers can tear under their dead weight.

The temperature range within the polyester can be spun (production window) depends on the polyester used. In the case of use of polyethylene terephthalate (PET) the temperature of the melt is typically at least 280° C. In case polytrimethylene terephthalate (PTT) the temperature of the melt is typically at least 260° C., and in the case of use of polybutylene terephthalate (PBT) the temperature of the melt is typically at least 250° C. However, the process window, within the polyester fibers can be produced is very small. Limiting the process window is the melt strength of the fiber melt and the viscosity at high shear rates, both are contradicting factors that occur around the spinneret of a fiber melt spinning process.

There is therefore a need for a polyester composition with which the production of polyester fibers via the melt spinning process within a wider production window is possible.

The objective technical problem underlying the present invention is therefore that of providing a polyester composition having a wider production window and that of providing an improved process for producing polyester fibers that has the disadvantages described above to a reduced degree, if at all.

This object is achieved by a process for the preparation of a spinnable composition (sC) comprising the step (I) mixing
- 80 to 99.5% by weight of at least one terephthalate polyester (A),
- 0.49 to 19.9% by weight of at least one aliphatic-aromatic polyester (B) obtainable by polymerization of at least the following monomers:
  - (m1) at least one aliphatic 1,ω-diol,
  - (m2) at least one aliphatic 1,ω-dicarboxylic acid compound, and
  - (m3) at least one aromatic 1,ω-dicarboxylic acid compound,
- 0.01 to 3% by weight of at least one oligomer (C) obtainable by polymerization of at least the following monomers:
  - (o1) at least one vinylic monomer containing no glycidyl group, and
  - (o2) at least one vinylic monomer containing a glycidyl group, and
- 0 to 5% by weight of at least one additive (D), wherein the % by weight are based in each case on the total weight of the components (A), (B), (C) and optionally (D) mixed in order to obtain the spinnable composition (sC).

It has been found that, surprisingly, the spinnable composition (sC) can be spun in a melt spinning process at higher temperatures. The spinnable composition (sC), moreover, shows a wider production window. The polyester fibers (PF) obtained by a melt spinning process wherein the spinnable composition (sC) is used, as well as the textile materials (T) produced from the polyester fibers (PF) show an improved dyeability. In other words, if the spinning is followed by a coloring operation, a light- and wash-fast coloring of the polyester fibers (PF) and/or the textile materials (T) obtained therefrom, is assured. They additionally have a broad available color spectrum in use, good rub fastness and very good wash fastness. In addition, it is also advantageous that the polyester fibers (PF) according to the invention are suitable in use for a blend fabric, for example together with wool, cotton, polyamide, viscose, acrylic or lycra. The blend fabric comprising the polyester fibers (PF) can likewise be colored very efficiently in a single bath, which means that there is no need for additional steps in which individual components of the blend fabric are colored separately.

The process of the invention is explained in more detail hereinafter.

Component (A)

Component (A) is at least one terephthalate polyester.

In the process for the preparation of the spinnable composition (sC) the amount of the at least one terephthalate polyester (A) used is generally in the range of 80 to 99.5% by weight, preferably in the range of 85 to 95% by weight of the at least one terephthalate polyester (A), based on the total weight the components (A), (B), (C) and optionally (D) mixed in order to obtain the spinnable composition (sC). In another embodiment the % by weight are based on the total weight of the spinnable composition (sC).

The terms "at least one terephthalate polyester (A)", "terephthalate polyester (A)", "terephthalate polyester" and "component (A)" are used synonymously in the context of the present invention and have the same meaning. Furthermore, in the context of the present invention, the term "at least one terephthalate polyester (A)" is understood to mean exactly one terephthalate polyester (A) and mixtures of two or more terephthalate polyesters (A). In a preferred embodiment, exactly one terephthalate polyester (A) is used in the process of the invention.

The terephthalate polyester (A) can be prepared by all methods known to those skilled in the art. In a preferred embodiment, the terephthalate polyester (A) is prepared by polycondensation of diols, terephthalic acid compounds and optionally isophtalic acid compounds. The terephthalate polyester (A) and the aliphatic-aromatic polyester (B) are different compounds. For the production of the terephthalate polyester (A) generally, compared to the production of the aliphatic-aromatic polyester (B), a lower amount of the aliphatic 1,ω-dicarboxylic acid compound is used. In a preferred embodiment for the production of the terephthalate polyester (A) no aliphatic 1,ω-dicarboxylic acid compound is used.

In a preferred embodiment the at least one terephthalate polyester (A) is obtainable by polymerization of at least the following monomers:
(n1) at least one aliphatic 1,ω-diol, and
(n2) at least one terephthalate acid compound.

In an even more preferred embodiment, the at least one terephthalate polyester (A) is obtained by polymerization of the following monomers:
(n1) at least one aliphatic 1,ω-diol,
(n2) at least one terephthalate acid compound, and
(n3) optionally at least one isophtalic acid compound.

Component (n1) is at least one aliphatic 1,ω-diol.

The terms "at least one aliphatic 1,ω-diol (n1), aliphatic 1,ω-diol (n1), aliphatic 1,ω-diol and component (n1)" are used synonymously in the context of the present invention and have the same meaning. In addition, in the context of the present invention, the term "at least one aliphatic 1,ω-diol (n1)" is understood to be exactly one aliphatic 1,ω-diol (n1) and mixtures of two or more aliphatic 1,ω-diols (n1). In a preferred embodiment, in the process of the invention, exactly one aliphatic 1,ω-diol (n1) is used.

The aliphatic 1,ω-diol (n1) can be linear, branched or cyclic. Moreover, the aliphatic 1,ω-diol (n1) can be saturated, joined by single bonds (alkanes), or unsaturated, with double bonds (alkenes) or triple bonds (alkynes). Moreover the aliphatic 1,ω-diol (n1) can contain hetero atoms like oxygen or sulfur substituting one or more carbon atoms of the carbon backbone.

In the context of the present invention, the aliphatic 1,ω-diol (n1) is preferably an aliphatic 1,ω-diol having 2 to 12, preferably having 2 to 6, more preferably 2 to 4 carbon atoms. The aliphatic 1,ω-diol (n1) may be linear, branched or cyclic.

Examples of aliphatic 1,ω-diols (n1) are ethylene glycol (ethane-1,2-diol), propane-1,3-diol, butane-1,4-diol, pentane-1,5-diol, hexane-1,6-diol, diethylene glycol, triethylene glycol, 2-methyl-1,3-propanediol, 2-ethyl-1,3-propanediol, 2,2-dimethylpropane-1,3-diol, 2-methyl-1,4-butanediol, 2-ethyl-2-butylpropane-1,3-diol, 2-ethyl-2-isobutylpropane-1,3-diol, 1,4-cyclohexandiol, cyclohexane-1,4-dimethanol or 2,2,4-trimethylhexane-1,6-diol.

Particularly preferred aliphatic 1,ω-diols (n1) are ethylene glycol, propane-1,3-diol or butane-1,4-diol, most preferably propane-1,3-diol. Preferably the component (n1) used for the preparation of the terephthalate polyester (A) consist of at least 95% by weigh, preferably at least 98% by weight of an diol selected from the group consisting of ethylene glycol, propane-1,3-diol and butane-1,4-diol and 0 to 5% by weight, preferably 0 to 2% by weight of at least one further diol, selected from the group consisting of Component (n2) is at least one terephthalic acid compound.

The terms "at least one terephtalic acid compound (n2)", "terephtalic acid compound (n2)", "terephtalic acid compound" and "component (n2)" are used synonymously in the context of the present invention and have the same meaning. In addition, in the context of the present invention, the term "at least one terephthalic acid compound (n2)" is understood to be exactly one terephthalic compound (n2) and mixtures of two or more terephthalic acid compound (n2). In a preferred embodiment, in the process of the invention, exactly one terephthalic acid compound (n2) is used. The same holds true for the optional isophtalic acid compound (n3), respectively.

In the context of the present invention, terephthalic acid compound (n2) is understood to mean terephthalic acid itself and derivatives of terephthalic acid, such as terephthalic esters. Useful terephthalic esters here include the di-$C_1$-$C_6$-alkyl esters of terephthalic acid, for example the dimethyl, diethyl, di-n-propyl, diisopropyl, di-n-butyl, diisobutyl, di-t-butyl, di-n-pentyl, diisopentyl or di-n-hexyl esters of terephthalic acid. The same holds true for the optional isophtalic acid compound (n3), respectively.

The terephthalic acid or derivatives thereof may be used individually or as a mixture of two or more thereof. In view of component (n2) particular preference is given to using terephthalic acid or dimethyl terephthalate.

In view of the optionally used component (n3) particular preference is given to using isophthalic acid, dimethyl isophtalate, 5-sulfoisophthalic acid mono sodium salt or dimethyl 5-sulfoisophtalate mono sodium salt.

In a preferred embodiment the at least on terephthalate polyester (A) is at least one polyester selected from the group consisting of polyethylene terephthalate (PET), polytrimethylene terephthalate (PTT) and polybutylene terephthalate (PBT).

In the context of the present invention PET, in a preferred embodiment, is understood to mean a polyester that contains at least 95% by mol of repetition units derived from the above defined terephthalic acid compounds (n2) and ethylene glycol (n1), wherein the polyester may optionally contain 0 to 5% by mol of further repetition units, based on the total number of mols of repetition units contained in the polyester. The further repetition units contained in the PET may be derived from the above defined components (n3) and the above mentioned components (n1), different from ethylene glycol.

In the context of the present invention PTT, in a preferred embodiment, is understood to mean a polyester that contains at least 65% by mol, preferably at least 80% by mol, more preferably at least 90% by mol and most preferably at least 95% by mol of repetition units derived from the above defined terephthalic acid compounds (n2) and propane-1,3-diol (n1), wherein the polyester may optionally contain 0 to 35% by mol, preferably 0 to 20% by mol, more preferably 0 to 10% by mol and most preferably 0 to 5% by mol of further repetition units, based on the total number of mols of repetition units contained in the polyester. The further repetition units contained in the PTT may be derived from the above defined components (n3) and the above mentioned components (n1), different from propane-1,3-diol.

In the context of the present invention PBT, in a preferred embodiment, is understood to mean a polyester that contains at least 65% by mol, preferably at least 80% by mol, more preferably at least 90% by mol and most preferably at least 95% by mol of repetition units derived from the above defined terephthalic acid compounds (n2) and butane-1,4-diol (n1), wherein the polyester may optionally contain 0 to 35% by mol, preferably 0 to 20% by mol, more preferably 0 to 10% by mol and most preferably 0 to 5% by mol of further repetition units, based on the total number of mols of repetition units contained in the polyester. The further repetition units contained in the PTT may be derived from the above defined components (n3) and the above mentioned components (n1), different from butane-1,4-diol.

Suitable polyethylene terephthalates (PET) are for example available from the manufacturer Indorama ventures under the trade name RAMAPET. Moreover, recycled polyethylene terephthalates (PET), for example from the recycling of plastic bottles (bottle grade PET) or for example from post-consumer fibers and post-industrial fiber waste, are suitable.

Suitable polytrimethylene terephthalates (PTT) are for example available from the manufacturer DuPont under the trade name Sorona. Moreover, recycled poltrimethylene terephthalates (PTT), for example from post-consumer fibers and post-industrial fiber waste, are suitable.

Suitable polybutylene terephthalates (PBT) are for example available from the manufacturer BASF SE under the trade name Ultradur® B 2550. Moreover, recycled polybutylene terephthalates (PBT), for example from post-industrial fibers, are suitable.

The polyethylene terephthalate (PET) especially preferred in accordance with the invention as terephthalate polyester (A) generally has a melting temperature ($T_M$) in the range from 220 to 280° C., preferably in the range from 230 to 270° C., determined by differential dynamic calorimetry (differential scanning calorimetry; DSC) at a heating and cooling rate of 10° C./min.

The polytrimethylene terephthalate (PTT) especially preferred in accordance with the invention as terephthalate polyester (A) generally has a melting temperature ($T_M$) in the range from 205 to 255° C., preferably in the range from 215 to 250° C., determined by differential dynamic calorimetry (differential scanning calorimetry; DSC) at a heating and cooling rate of 10° C./min.

The polybutylene terephthalate (PBT) preferred in accordance with the invention as terephthalate polyester (A) generally has a melting temperature ($T_M$) in the range from 180 to 250° C., preferably in the range from 210 to 240° C., determined by differential dynamic calorimetry (differential scanning calorimetry; DSC) at a heating and cooling rate of 10° C./min.

Preferably the terephthalate polyester (A) is a polyester selected from polyethylene terephthalate (PET) and polytrimethylene terephthalate (PTT). A particularly preferred terephthalate polyester (A) is polytrimethylene terephthalate (PTT).

For the preparation of the at least one terephthalate polyester (A) used in accordance with the invention, typical reaction conditions and catalysts are known in principle to those skilled in the art.

Component (B)

Component (B) is at least one aliphatic-aromatic polyester.

In the process for the preparation of the spinnable composition (sC) the amount of the at least one aliphatic-aromatic polyester (B) used is generally in the range of 0.49 to 19.99% by weight, preferably in the range of 4.95 to 14.95% by weight of the at least one aliphatic-aromatic polyester (B), based on the total weight the components (A), (B), (C) and optionally (D) mixed in order to obtain the spinnable composition (sC). In another embodiment the % by weight are based on the total weight of the spinnable composition (sC).

The terms "at least one aliphatic-aromatic polyester (B)", "aliphatic-aromatic polyester (B)", "aliphatic-aromatic polyester" and "component (B)" are used synonymously in the context of the present invention and have the same meaning. Furthermore, in the context of the present invention, the term "at least one aliphatic-aromatic polyester (B)" is understood to mean exactly one aliphatic-aromatic polyester (B) and mixtures of two or more aliphatic-aromatic polyesters (B). In a preferred embodiment, in the process of the invention, exactly one aliphatic-aromatic polyester (B) is used.

The at least one aliphatic-aromatic polyester (B) is obtainable by polymerization of at least the following monomers:
    (m1) at least one aliphatic 1,ω-diol,
    (m2) at least one aliphatic 1,ω-dicarboxylic acid compound, and
    (m3) at least on aromatic 1,ω-dicarboxylic acid compound.

Component (m1)

Component (m1) is at least one aliphatic 1,ω-diol.

The terms "at least one aliphatic 1,ω-diol (m1)", "aliphatic 1,ω-diol (m1)", "aliphatic 1,ω-dio"I and "component (m1)" are used synonymously in the context of the present invention and have the same meaning. In addition, in the context of the present invention, the term "at least one aliphatic 1,ω-diol (m1)" is understood to be exactly one aliphatic 1,ω-diol (m1) and mixtures of two or more aliphatic 1,ω-diols (m1). In a preferred embodiment, in the process of the invention, exactly one aliphatic 1,ω-diol (m1) is used.

Aliphatic 1,ω-diols are known in principle to those skilled in the art.

Examples of aliphatic 1,ω-diols (m1) are ethylene glycol, propane-1,3-diol, butane-1,4-diol, pentane-1,5-diol, hexane-1,6-diol, 2,2-dimethylpropane-1,3-diol, 2-ethyl-2-butylpropane-1,3-diol, 2-ethyl-2-isobutylpropane-1,3-diol, cyclohexane-1,4-dimethanol, $C_{36}$-diol with CAS no. 147853-32-5 or 2,2,4-trimethylhexane-1,6-diol or In the context of the present invention, the aliphatic 1,ω-diol (m1) is preferably an aliphatic 1,ω-diol having 2 to 12, preferably having 4 to 6, carbon atoms. The aliphatic 1,ω-diol (m1) may be linear or branched.

Particularly preferred aliphatic 1,ω-diols (m1) are ethylene glycol, propane-1,3-diol or butane-1,4-diol, most preferably butane-1,4-diol.

Component (m2)

Component (m2) is at least one aliphatic 1,ω-dicarboxylic acid compound.

The terms "at least one aliphatic 1,ω-dicarboxylic acid compound (m2)", "aliphatic 1,ω-dicarboxylic acid compound (m2)", "aliphatic 1,ω-dicarboxylic acid compound" and "component (m2)" are used synonymously in the context of the present invention and have the same meaning. In addition, in the context of the present invention, the term at "least one aliphatic 1,ω-dicarboxylic acid compound (m2)" is understood to mean exactly one aliphatic 1,ω-dicarboxylic acid compound (m2) and mixtures of two or more aliphatic 1,ω-dicarboxylic acids compounds (m2). In a preferred embodiment, in the process of the invention, exactly one aliphatic 1,ω-dicarboxylic acid compound (m2) is used.

Aliphatic 1,ω-dicarboxylic acid compounds are known in principle to those skilled in the art.

In the context of the present invention, aliphatic 1,ω-dicarboxylic acid compound (m2) is understood to mean aliphatic 1,ω-dicarboxylic acid itself and derivatives of 1,ω-dicarboxylic acid, such as 1,ω-dicarboxylic acid esters. Useful 1,ω-dicarboxylic acid esters here include the di-$C_1$-$C_6$-alkyl esters of 1,ω-dicarboxylic acid, for example the dimethyl, diethyl, di-n-propyl, diisopropyl, di-n-butyl, diisobutyl, di-t-butyl, di-n-pentyl, diisopentyl or di-n-hexyl esters of 1,ω-dicarboxylic acid.

In the context of the present invention, the aliphatic 1,ω-dicarboxylic acid compound (m2) is preferably an aliphatic 1,ω-dicarboxylic acid having 2 to 40, preferably having 4 to 17, carbon atoms. The aliphatic 1,ω-dicarboxylic acid compound (m2) may be linear, branched or cyclic.

Examples of aliphatic 1,ω-dicarboxylic acids (m2) are malonic acid, succinic acid, 2-methylsuccinic acid, glutaric acid, 2-methylglutaric acid, 3-methylglutaric acid, adipic acid, pimelic acid, suberic acid, azelaic acid, sebacic acid, undecanedioic acid, dodecanedioic acid, brassylic acid, tetradecanedioic acid, fumaric acid, 2,2-dimethylglutaric acid, dimer fatty acid (for example EMPOL® 1061 from Cognis), cyclopentane-1,3-dicarboxylic acid, diglycolic acid, itaconic acid, maleic acid or norbornene-2,5-dicarboxylic acid.

Particularly preferred aliphatic 1,ω-dicarboxylic acids m2) are succinic acid, glutaric acid, adipic acid, azelaic acid, sebacic acid or brassylic acid, most preferably succinic acid, adipic acid or sebacic acid.

Examples esters of aliphatic 1,ω-dicarboxylic acids (m2) are preferably dimethyl esters of the aforementioned 1,ω-dicarboxylic acids (m2).

In this case, the esters of the abovementioned aliphatic 1,ω-dicarboxylic acids may be used individually or else as a mixture of two or more esters of the aliphatic 1,ω-dicarboxylic acids.

In addition, it is also possible to use a mixture of at least one aliphatic 1,ω-dicarboxylic acid and at least one ester of an aliphatic 1,ω-dicarboxylic acid.

Component (m3)

Component (m3) is at least one aromatic 1,ω-dicarboxylic acid compound.

The terms "at least one aromatic 1,ω-dicarboxylic acid compound (m3)", "aromatic 1,ω-dicarboxylic acid compound (m3)", "aromatic 1,ω-dicarboxylic acid compound" and "component (m3)" are used synonymously in the context of the present invention and have the same meaning. In addition, in the context of the present invention, the term "at least one aromatic 1,ω-dicarboxylic acid compound (m3)" is understood to mean exactly one aromatic 1,ω-dicarboxylic acid compound (m3) and mixtures of two or more aromatic 1,ω-dicarboxylic acids compounds (m3). In a preferred embodiment, in the process of the invention, exactly one aromatic 1,ω-dicarboxylic acid compound (m3) is used.

Aromatic 1,ω-dicarboxylic acids compounds (m3) in the context of the present invention are understood to mean the aromatic 1,ω-dicarboxylic acids themselves and derivatives of the aromatic 1,ω-dicarboxylic acids, such as aromatic 1,ω-dicarboxylic esters. Useful esters of the aromatic 1,ω-dicarboxylic acids here include the di-$C_1$-$C_6$-alkyl esters of the aromatic 1,ω-dicarboxylic acids, for example the dimethyl, diethyl, di-n-propyl, diisopropyl, di-n-butyl, diisobutyl, di-t-butyl, di-n-pentyl, diisopentyl or di-n-hexyl esters of the aromatic 1,ω-dicarboxylic acids.

Examples of aromatic 1,ω-dicarboxylic acid compounds (m3) are terephthalic acid, furandicarboxylic acid, isophthalic acid, 2,6-naphthoic acid or 1,5-naphthoic acid.

In the context of the present invention, the aromatic 1,ω-dicarboxylic acid compound (m3) is preferably an aromatic 1,ω-dicarboxylic acid having 6 to 12, preferably one having 6 to 8 carbon atoms, more preferably one having 8 carbon atoms. In a preferred embodiment of the present invention, the aromatic 1,ω-dicarboxylic acid compound (m3) is terephthalic acid or dimethyl terephthalate.

It will be apparent that it is also possible to use the esters of the abovementioned aromatic 1,ω-dicarboxylic acids as component (m3). In this case, it is possible to use the esters of the abovementioned aromatic 1,ω-dicarboxylic acids individually or else as a mixture of two or more esters of the aromatic 1,ω-dicarboxylic acids.

In addition, it is also possible to use a mixture of at least one aromatic 1,ω-dicarboxylic acid and at least one ester of an aromatic 1,ω-dicarboxylic acid.

Component (CE)

In order to obtain the aliphatic-aromatic polyester (B) in the polymerization at least of the monomers m ((m1), (m2), (m3)), at least one chain extender (CE) is optionally used.

The terms "at least one chain extender (CE)", "chain extender (CE)", "chain extender" and "component (CE)" are used synonymously in the context of the present invention and have the same meaning. In addition, in the context of the present invention, the term "at least one chain extender (CE)" is understood to mean exactly one chain extender (CE) and mixtures of two or more chain extenders (CE). In a preferred embodiment, in the process of the invention, exactly one chain extender (CE) is used.

The at least one chain extender (CE) is preferably selected from the group consisting of compounds comprising at least three groups capable of ester formation (CE1) and of compounds comprising at least two isocyanate groups (CE2).

The compounds (CE1) preferably comprise 3 to 10 functional groups capable of forming ester bonds. Particularly preferred compounds (CE1) have 3 to 6 functional groups of this kind in the molecule, especially 3 to 6 hydroxyl groups and/or carboxyl groups.

Examples of the compounds (CE1) are tartaric acid, citric acid, malic acid, trimethylolpropane, trimethylolethane, pentaerythritol, polyether triols, glycerol, trimesic acid, trimellitic acid, trimellitic anhydride, pyromellitic acid, pyromellitic dianhydride or hydroxyisophthalic acid.

In general, the compounds (CE1) are used in amounts of 0.01 to 15 mol %, preferably of 0.05 to 10 mol %, more preferably of 0.1 to 4 mol %, based on the sum total of the molar amounts of components (m2) and (m3).

The compounds (CE2) preferably comprise a diisocyanate or a mixture of different diisocyanates. It is possible to use aromatic or aliphatic diisocyanates. But it is also possible to use higher-functionality isocyanates.

In the context of the present invention, an "aromatic diisocyanate" is understood to mean, in particular, tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate or xylylene diisocyanate.

In the context of the present invention, preferred aromatic diisocyanates are diphenylmethane 2,2'-diisocyanate, diphenylmethane 2,4'-diisocyanate and diphenylmethane 4,4'-diisocyanate; particular preference is given to using these diphenylmethane diisocyanates as mixtures.

Preferably, the compounds (CE2) comprise up to 5% by weight, based on the total weight of the compounds (CE2), of urethione groups. These serve, for example, to cap the isocyanate groups.

The compounds (CE2) may also comprise a tricyclic aromatic diisocyanate. One example of a tricyclic aromatic isocyanate is tri(4-isocyanophenyl)methane. The polycyclic aromatic diisocyanates are obtained, for example, in the preparation of mono- or bicyclic aromatic diisocyanates.

An "aliphatic diisocyanate" in the context of the present invention is understood to mean, in particular, linear or branched alkylene diisocyanates or cycloalkylene diisocyanates having 2 to 20 carbon atoms, preferably 3 to 12 carbon atoms, for example hexamethylene 1,6-diisocyanate, pentamethylene 1,5-diisocyanate, isophorone diisocyanate or methylenebis(4-isocyanatocyclohexane). Particularly preferred aliphatic diisocyanates are hexamethylene 1,6-diisocyanate, pentamethylene 1,5-diisocyanate and isophorone diisocyanate.

But it is also possible to use aliphatic diisocyanates based on n-hexamethylene diisocyanate, for example cyclic trimers, pentamers or higher oligomers of n-hexamethylene diisocyanate.

Preference is given to using the compounds (CE2) in amounts of 0.01 to 5 mol %, preferably in amounts of 0.05 to 4 mol %, more preferably in amounts of 0.1 to 4 mol %, based on the sum total of the molar amounts of components m1), m2) and m3).

For the preparation of the at least one aliphatic-aromatic polyester (B) used in accordance with the invention, typical reaction conditions and catalysts are known in principle to those skilled in the art.

The at least one aliphatic-aromatic polyester (B) typically has generally a glass transition temperature $T_G$. The glass transition temperature $T_G$ of the at least one aliphatic-aromatic polyester (B) is typically in the range from −50 to 0° C., preferably in the range from −45 to −10° C. and especially preferably in the range from −40 to −20° C., determined by DSC.

The weight-average molecular weight ($M_w$) of the at least one aliphatic-aromatic polyester (B) is typically in the range from 50 000 to 300 000 g/mol, preferably in the range from 50 000 to 150 000 g/mol, determined by means of gel permeation chromatography (GPC) (size exclusion chromatography (SEC)). The solvent used was 1,1,1,3,3,3-hexafluoro-2-propanol against narrow-distribution polymethylmethacrylate (PMMA) standards.

The at least one aliphatic-aromatic polyester (B) generally has a melting temperature ($T_M$) in the range from 90 to 150° C., preferably in the range from 100 to 140° C., determined by dynamic differential calorimetry (differential scanning calorimetry; DSC).

Component (C)

Component (C) is at least one oligomer (C).

In the process for the preparation of the spinnable composition (sC) the amount of the at least one oligomer (C) used is generally in the range of 0.01 to 3% by weight, preferably in the range of 0.05 to 1% by weight of the at least one oligomer (C), based on the total weight the components (A), (B), (C) and optionally (D) mixed in order to obtain the spinnable composition (sC). In another embodiment the % by weight are based on the total weight of the spinnable composition (sC).

The terms at least one oligomer (C), oligomer (C) and component (C) are used synonymously in the context of the present invention and have the same meaning. Furthermore, in the context of the present invention, the term "at least one oligomer (C)" is understood to mean exactly one oligomer (C) and mixtures of two or more oligomers (C). In a preferred embodiment, in the process of the invention, exactly one oligomer (C) is used.

The at least one oligomer (C) is obtainable by polymerization of at least the following monomers:
(o1) at least one vinylic monomer containing no glycidyl group, and
(o2) at least one vinylic monomer containing a glycidyl group.

The polymerization is initiated by an initiator (i1).

Component (o1)

Component (o1) is at least one vinylic monomer containing no glycidyl group.

The terms "at least one vinylic monomer containing no glycidyl group (o1)", "vinylic monomer containing no glycidyl group (o1)", "vinylic monomer containing no glycidyl group" and "component (o1)" are used synonymously in the context of the present invention and have the same meaning. In addition, in the context of the present invention, the term "at least one vinylic monomer containing no glycidyl group (o1)" is understood to be exactly one vinylic monomer containing no glycidyl group (o1) and mixtures of two or more vinylic monomer containing no glycidyl group (o1). In a preferred embodiment, in the process of the invention, exactly one vinylic monomer containing no glycidyl group (o1) is used.

Preferred the component (o1) is selected from the group consisting of styrenic monomers and (meth)acrylic monomers.

As used herein, "styrenic monomers" refer to, α-methyl styrene, styrene, vinyl toluene, 4-tert-Butylstyrene, o-chlorostyrene, and the like. In a preferred embodiment the styrenic monomers are selected of the group consisting of α-methyl styrene, styrene, vinyl toluene, 4-tert-Butylstyrene and o-chlorostyrene.

In a more preferred embodiment the styrenic monomer is α-methyl styrene, styrene, and/or vinyl toluene. Particularly preferred is styrene.

As used herein, "(meth)acrylic monomers" refer to acrylic acid, methacrylic acid, esters of acrylic acid, esters of methacrylic acid, and to salts, amides, and other suitable derivatives of acrylic acid or methacrylic acid, and mixtures thereof.

Examples of suitable (meth)acrylic monomers include the following methacrylate esters:
including methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate, and acrylate esters:
including methyl acrylate, ethyl acrylate, n-propyl acrylate, isopropyl acrylate, n-butyl acrylate, n-decyl acrylate, isobutyl acrylate, n-amyl acrylate, n-hexyl acrylate, isoamyl acrylate, 2-hydroxyethyl acrylate, 2-hydroxypropyl acrylate, N,N-dimethylaminoethyl acrylate, N,N-diethylaminoethyl acrylate, t-butylaminoethyl acrylate, 2-sulfoethyl acrylate, trifluoroethyl acrylate, benzyl acrylate, allyl acrylate, 2-n-butoxyethyl acrylate, 2-chloroethyl acrylate, sec-butyl-acrylate, tert-butyl acrylate, 2-ethylbutyl acrylate, cinnamyl acrylate, crotyl acrylate, cyclohexyl acrylate, cyclopentyl acrylate, 2-ethoxyethyl acrylate, furfuryl acrylate, hexafluoroisopropyl acrylate, methallyl acrylate, 3-methoxybutyl acrylate, 2-methoxybutyl acrylate, 2-nitro-2-methylpropyl acrylate, n-octylacrylate, 2-ethylhexyl acrylate, 2-phenoxyethyl acrylate, 2-phenylethyl acrylate, phenyl acrylate, propargyl acrylate, tetrahydrofurfuryl acrylate and tetrahydropyranyl acrylate, and methacrylic acids derivatives:

including methacrylic acid, methacrylic acid salts, methacrylonitrile, methacrylamide, N-methylmethacrylamide, N-ethylmethacrylamide, N,N-diethylmethacrylamide, N,N-dimethylmethacrylamide, N-phenylmethacrylamide and methacrolein, and acrylic acid derivatives:

including, acrylic acid and acrylic acid salts, acrylonitrile, acrylamide, methyl α-chloroacrylate, methyl 2-cyanoacrylate, N-ethylacrylamide, N,N-diethylacrylamide and acrolein.

In a more preferred embodiment the (meth)acrylic monomer is at least on monomer selected from the group consisting of acrylic acid, methacrylic acid and n-butylacrylate.

In a more preferred embodiment, the component (o1) is at least one monomer selected from the group consisting of styrene, acrylic acid and methacrylic acid.

Component (o2)

Component (o2) is at least one vinylic monomer containing a glycidyl group.

The terms at least one vinylic monomer containing a glycidyl group (o2), vinylic monomer containing a glycidyl group (o2), vinylic monomer containing a glycidyl group and component (o2) are used synonymously in the context of the present invention and have the same meaning. In addition, in the context of the present invention, the term "at least one vinylic monomer containing a glycidyl group (o2)" is understood to be exactly one vinylic monomer containing a glycidyl group (o2) and mixtures of two or more vinylic monomer containing 2 glycidyl group (o2). In a preferred embodiment, in the process of the invention, exactly one vinylic monomer containing a glycidyl group (o2) is used.

Preferably the component (o2) is glycidylmethacrylate and/or glycidylacrylate, wherein gylcidylmethacrylate is especially preferred.

The initiator (i1) can be thermally decomposed into radicals. Suitable initiators include those with half-life periods in the radical decomposition process of 1 hour at temperatures greater or equal to 90° C., and further include those with half-life periods in the radical decomposition process of 10 hours at temperatures greater or equal to 100° C. Others with 10 hour half-lives at temperatures lower than 100° C. may also be used. For example, and without limitation, the polymerization initiators may include, but is not limited to, 2,2'-azodi-(2, 4-dimethylvaleronitrile); 2,2'-azobisisobutyronitrile (AIBN); 2,2'-azobis(2-methylbutyronitrlle); 1,1'-azobis(cyclohexane-carbonitrile); tertiary butylperbenzoate; tert-amyl peroxy 2-ethylhexyl carbonate; 1,1-bis(tert-amylperoxy)cyclohexane, tert-amylperoxy-2-ethylhexanoate, tert-amylperoxyacetate, tert-butylperoxyacetate, tert-butylperoxybenzoate (TBPB), 2,5-di-(tert-butylperoxy)-2, 5-dimethylhexane, di-tert-amyl peroxide (DTAP); di-tert-butylperoxide (DTBP); lauryl peroxide; dilauryl peroxide (DLP), succinic acid peroxide; or benzoyl peroxide. In some embodiments, the polymerization initiator includes 2,2'-azodi-(2, 4-dimethylvaleronitrile); 2,2'-azobisisobutyronitrile (AIBN); or 2,2'-azobis(2-methylbutyronitrlle). In other embodiments, the polymerization initiator includes di-tert-amyl peroxide (DTAP); di-tert-butylperoxide (DTBP); lauryl peroxide; succinic acid peroxide; or benzoyl peroxide. The amount of polymerization initiator that is used is dependent upon the conditions of the reaction and may be adjusted accordingly.

The oligomer (C) can be obtained by radical polymerization of at least the monomers (o1) and (o2). The radical polymerization is known to the person skilled in the art and is typically carried out in the presence of a polymerization initiator in a reaction solvent.

Suitable preparation methods for the oligomer (C) are for example described in U.S. Pat. No. 8,785,548 B2.

The oligomer (C) is recognizable by a low number of unsaturated olefinic polymer chain ends (end groups). Polymer chain ends are the extremities of the oligomer that, in this case, are chemically different to the repeating units. Side groups that are introduced through the monomers, such as esters, glycidyl ethers and benzene groups are not considered to be polymer chain end groups. The low content of olefinic end groups can be determined by a significant lower IR signal between 1645 cm$^{-1}$ and 1610 cm$^{-1}$ or a lack of an $^1$H-NMR signal in the range of 4.5 to 5.5 ppm compared to the tetramethylsilane standard.

Preferably the oligomer (C) is obtained by polymerization of 10 to 90% by mol, preferably 20 to 80% by mol of component (o1), and 90 to 10% by mol, preferably 80 to 20% by mol of component (o2).

More preferred are oligomers (C) obtained by polymerization of 10 to 90% by mol, preferably 20 to 80% by mol of component (o1), and 90 to 10% by mol, preferably 80 to 20% by mol of component (o2), wherein component (o1) is at least one compound selected from the group consisting of acrylic acid, methacrylic acid and styrene, and component (o2) is at least one compound selected from the group consisting of glycidylmethacrylate and glycidylacrylate.

Particularly preferred are oligomers (C) obtained by polymerization of 10 to 90% by mol, preferably 20 to 80% by mol of component (o1), and 90 to 10% by mol, preferably 80 to 20% by mol of component (o2), wherein component (o1) is styrene, and component (o2) is glycidylmethacrylate.

The oligomer (C) has generally a number average molecular weight (Mn) in the range of 500 to 50000 g/mol, preferably in the range of 1000 to 30000 g/mol, and more preferably in the range of 2000 to 20000 g/mol. The number average molecular weight (Mn) is determined by a measurement on a GPC with a tetrahydrofuran (THF) solution of the polymer with a polystyrene standard.

The oligomer (C) contains glycidyl groups (reactive groups). The oligomer (C) contains on average generally in the range of 0.1 to 50% of the embedded glycidyl (meth) acrylate monomers, preferably in the range of 1 to 50% of monomer composition. The average number of glycidyl groups contained in the oligomer (C) is determined by a $^1$H-NMR measurement of the oligomer in a deuterated chloroform solution.

Another object of the present invention is a process, wherein the at least one vinylic monomer containing no glycidyl group (o1) is a styrenic monomer and/or a (meth) acrylic monomer and the at least one vinylic monomer containing a glycidyl group (o2) is glycidyl methacrylate and/or glycidyl acrylate.

The term "end group" means the groups at the chain end of the oligomer (C).

The end groups contained in the oligomer (C) are preferably saturated end groups containing a C—bond (carbon single bond) instead of C═C bonds (carbon double bonds). The amount of end groups contained in the oligomer (C) is determined by the low content of olefinic end groups can be determined by a significant lower IR signal between 1645 cm$^{-1}$ and 1610 cm$^{-1}$ or a lack of an $^1$H-NMR signal in the range of 4.5 to 5.5 ppm compared to the tetramethylsilane standard.

In a preferred embodiment the oligomer (C) contains at least 90% of saturated end groups, based on the total amount of end groups contained in the oligomer (C).

Component (D)

Component (D) is at least one additive.

In the process for the preparation of the spinnable composition (sC) the amount of the at least one additive (D) used is generally in the range of 0 to 5% by weight, preferably in the range of 0 to 1.5% by weight of the at least one additive (D), based on the total weight the components (A), (B), (C) and optionally (D) mixed in order to obtain the spinnable composition (sC). In another embodiment the % by weight are based on the total weight of the spinnable composition (sC).

The terms "at least one additive (D")", "additive (D)", "additive" and "component (D)" are used synonymously in the context of the present invention and have the same meaning. In addition, in the context of the present invention, the term "at least one additive (D)" is understood to mean exactly one additive (D) and mixtures of two or more additives (D).

Suitable additives (D) are known to those skilled in the art.

Examples of additives (D) are lubricants, nucleating agents, compatibilizers, flame retardants, reinforcing materials, plasticizers, antioxidants, UV stabilizers, mineral fillers and pigments.

In the context of the present invention, preference is given to using lubricants, nucleating agents and/or compatibilizers.

Useful lubricants or else mold release agents have been found to be especially hydrocarbons, fatty alcohols, higher carboxylic acids, metal salts of higher carboxylic acids, such as calcium stearate or zinc stearate, fatty acid amides, such as erucamide, and wax types, for example paraffin waxes, beeswaxes or montan waxes. Preferred lubricants are erucamide and/or wax types, and more preferably combinations of these lubricants. Preferred wax types are beeswaxes and ester waxes, especially glycerol monostearate or dimethylsiloxane or polydimethylsiloxane, for example Belzil and DM® from Waga. By virtue of the addition of the lubricants prior to the chain extension, it is possible to partly bind the lubricants to the polymer chain. In this way, it is possible to effectively prevent premature exudation of lubricants out of the finished polymer compound.

Useful nucleating agents generally include inorganic compounds such as talc, chalk, mica, silicon oxides or barium sulfate. In the production of the polyester fibers (PF) of the invention, aromatic polyesters in particular, such as polyethylene terephthalate and especially polybutylene terephthalate, have been found to be advantageous.

Advantageous compatibilizers have been found to be aliphatic polyesters such as polylactic acid, polycaprolactone, polyhydroxyalkanoate or polyglycolic acid (PGA).

Process for the Preparation of the Spinnable Composition (sC)

In a preferred embodiment the process for the preparation of a spinnable composition (sC) comprise the step (I) mixing
  85 to 95% by weight of at least one terephthalate polyester (A),
  4.95 to 14.95% by weight of at least one aliphatic-aromatic polyester (B),
  0.05 to 1% by weight of at least one oligomer (C), and
  0 to 5% by weight of at least one additive (D),
wherein the % by weight are based in each case on the total weight of the components (A), (B), (C) and optionally (D) mixed in order to obtain the spinnable 40 composition (sC).

The mixing according to step (I) can be carried out in all apparatuses known to the person skilled in the art. Preference is given to conducting the mixing step (I) in an extruder.

In a preferred step (I) comprising the steps:
  (Ii) mixing the at least one aliphatic-aromatic polyester (B) with the at least one oligomer (C) in order to obtain a first mixture (M1), and
  (Iii) mixing the first mixture (M1) with the at least one terephthalate polyester (A) in order to obtain the spinnable composition (sC).

In case the spinnable composition (sC) contains an additive (D) in a preferred embodiment, step (I) comprises the steps:
  (Ii) mixing the at least one aliphatic-aromatic polyester (B) with the at least one oligomer (C) and the at least one additive (D) in order to obtain a first mixture (M1), and
  (Iii) mixing the first mixture (M1) with the at least one terephthalate polyester (A) in order to obtain the spinnable composition (sC).

According to the invention the aforementioned preferred embodiment and preferences in view of the process for the preparation of the spinnable composition (sC) are preferably combined with the aforementioned description and preferences in view of components (A) to (D).

Another object of the present invention is a spinnable composition (sC) obtained by the process for the preparation of a spinnable composition (sC).

Process for the Preparation of Polyester Fibers (PF)

Another object of the present invention is a process for the preparation of polyester fibers (PF) comprising the steps of
  (i) providing a spinnable composition (sC), and
  (ii) extruding the spinnable composition (sC) through at least one spinneret in order to obtain the polyester fibers (PF).

Step (i)

In step (i) the spinnable composition (sC) is provided.

In a preferred embodiment, the process for the preparation of polyester fibers (PF) according to the invention is conducted in an extruder comprising at least one mixing segment and at least one conveying segment. The mixing segment generally comprises at least one mixing element;

the conveying segment generally comprises at least one conveying element. In addition, the extruder used with preference in the process of the invention comprises at least one spinneret.

Suitable spinnerets, conveying elements and mixing elements are known to those skilled in the art. Preference is given to using single-screw extruders, twin-screw extruders static mixers or melt pumps since homogeneous mixing can be achieved via the length and type of screw, temperature and residence time in the extruder. The extruder may, as well as the at least one mixing segment, the at least one conveying segment and the at least one spinneret, have backup zones and venting zones. The extruder used with preference in the process of the invention thus comprises at least one mixing segment followed by at least one conveying segment, with the at least one spinneret following on from the at least one conveying segment.

In step (i) the spinnable composition (sC) is generally provided in an extruder. In one embodiment the ready mixed spinnable composition (sC) is fed to the extruder.

Therefore, the components (A), (B), (C) and optionally can be mixed in an external mixing device in order to obtain the spinnable composition (sC) which can be subsequently fed to the extruder.

In a preferred embodiment, step (i) is conducted in an extruder, preferably in the at least one mixing segment of the extruder. In other word the process for the preparation of the spinnable composition (sC) is conducted in an extruder, preferably in the at least on mixing segment of the extruder.

Preferably in the at least one mixing segment, components (A), (B), (C) and optionally (D) are then mixed to obtain the spinnable composition (sC). From the at least one mixing segment, the spinnable composition (sC), in a preferred embodiment, passes into the at least one conveying segment (in this regard, see also step (ii) below).

In one embodiment in step (i), the at least one terephthalate polyester (A), the at least one aliphatic-aromatic polyester (B), the at least one oligomer (C) and optionally the at least one additive (A) are metered into the extruder, for example in granular form, preferably using corresponding metering devices. Components (A), (B), (C) and optionally (D) can be metered to the extruder one after the other, wherein the order of the addition is freely selectable. Moreover, it is possible to meter all components together.

In a preferred embodiment in step (i) the above mentioned first mixture (M1) obtained by mixing components (B) and (C) and the second mixture (M2) containing component (A) are fed to the extruder. If additives (D) are used, they can be comprised in the first mixture (M1) and/or the second mixture (M2) or can be added separately to the extruder In the mixing segment of the extruder, components (A), (B), (C) and optionally (D) are preferably mixed with one another by heating until a melt is obtained. The temperature in step (i) is chosen by the person skilled in the art and is guided by the nature of components (A), (B), (C) and optionally (D).

The at least one terephthalate polyester (A) and the at least one aliphatic-aromatic polyester (B) and the at least one oligomer (C) should on the one hand soften to a sufficient degree that mixing and conveying is possible. On the other hand, they should not become too mobile because it is otherwise not possible to introduce sufficient shear energy and, under some circumstances, there is also a risk of thermal degradation.

The temperature in step (i) generally depends on the component (A) used. Preferably step (i) is conducted at a temperature of 230 to 290° C., preferably at a temperature of 270 to 280° C. In a preferred embodiment, the temperature in step (i) is measured at the extruder shell that surrounds the mixing segment.

Step (ii)

In step (ii), the spinnable composition (cS), obtained in step (i), preferably in form of a melt, is extruded through at least one spinneret to obtain the polyester fibers (PF).

In a preferred embodiment, the spinnable composition (cS) obtained in step (i) passes from the at least one mixing segment of the extruder into the at least one conveying segment of the extruder. From the at least one conveying segment, the spinnable composition (cS) then subsequently preferably passes to the at least one spinneret through which it is extruded. Preferably, the spinnable composition (cS) obtained is extruded through multiple spinnerets to obtain the polyester fibers (PF).

Preferably, step (ii) is conducted in the same extruder as step (i).

The person skilled in the art is aware in principle of how the extrusion through the at least one spinneret is conducted. The at least one spinneret is preferably a perforated die, for example a 24-hole die with a normal sieve. The spinneret may be varied depending on fiber type and the targeted single filament fiber diameter and shape.

According to the invention the aforementioned preferred embodiment and preferences in view of the process for the preparation of the polyester fiber (PF) are preferably combined with the aforementioned description and preferences in view of components (A) to (D) and the process for the preparation of the spinnable composition (sC)

Another object of the present invention are the polyester fibers (PF) obtained by the process for the preparation of polyester fibers (PF).

The polyester fibers (PF) produced by the process of the invention can be used for production of textile materials (T).

The present invention thus also provides for the use of the polyester fibers (PF) of the invention for production of textile materials (T).

Another object of the present invention, therefore, is a textile material (T) comprising the polyester fibers (PF) according to the invention The term "textile material (T)" in the context of the present invention encompasses all materials throughout the production chain of textiles, for example all kinds of textile finished products, for example all kinds of apparel, domestic textiles such as carpets, curtains, covers or pieces of furniture, or industrial textiles for industrial or commercial purposes, or textiles for domestic applications, for example cloths or wiping cloths for cleaning. The term additionally also includes the starting materials and semifinished articles or intermediate products, for example yarns, weaves, loop-drawn knits, loop-formed knits, nonwovens or fleeces. Also encompassed by the invention are fillers and flocs for textiles, for example cushions or else stuffed toy animals.

Another object of the present invention therefore is a textile material (T) wherein the textile material (T) is selected from the group consisting of apparel, carpets, curtains, covers or pieces of furniture, industrial textiles, cloths, wiping, yarns, weaves, loop-drawn knits, loop-formed knits, nonwovens, fleeces and cushions.

Textile materials (T) that are preferred in accordance with the invention are especially textile materials (T) for sports and leisure clothing, yarns, carpets or nonwovens.

Another object of the present invention therefore is a textile material (T) wherein the textile material (T) is selected from the group consisting of sports and leisure clothing, yarns, carpets and nonwovens.

The term "yarn" in the context of the present invention is understood to mean a long, thin structure made from one or more fibers.

Processes for production of textile materials (T), also named textile finished products, from fibers and/or yarns are known in principle to those skilled in the art.

The textile finished products may be produced exclusively from the polyester fibers (PF) used in accordance with the invention. However, they may of course also be produced from a combination of the polyester fibers (PF) used in accordance with the invention with other materials, for example natural fibers. A combination may be undertaken at various manufacturing stages. For example, as early as the melt-spinning stage, it is possible to produce fibers from two or more polymers having a defined geometric arrangement. In yarn production, it is possible to incorporate fibers made from other polymers as well, or to produce fiber blends from staple fibers. In addition, it is possible to process different kinds of yarns together, and it is finally also possible to combine other semifinished articles or intermediate articles comprising the polyester fibers (PF) produced by the process of the invention with chemically different semifinished articles or intermediate products.

The polyester fibers (PF) produced by the process of the invention can be processed to give textile finished products, semifinished articles or intermediate products and then colored. However, the polyester fibers (PF) can also first be colored and then processed further to give textile finished products, semifinished articles or intermediate products.

Processes for producing textile finished products, semifinished articles or intermediate products from fibers are known to those skilled in the art. Likewise known to those skilled in the art are processes for coloring fibers, textile finished products, semifinished articles or intermediate products.

Another object of the present invention is a process for the preparation of dyed polyester fibers (dPF), and/or dyed textile materials (dT) comprising the step of (a) contacting the polyester fibers (PF) according to the invention, and/or the textile material (T) according to the invention with at least one dye.

The polyester fibers (PF) and/or the textile material (T) can, according to step (a) be contacted with the dye at a temperature below 130° C., preferably at a temperature below 120° C., more preferably at a temperature below 110° C., even more preferably at a temperature below 100° C. and especially preferably at a temperature below 80° C.

Another object of the present invention is the use of an oligomer (C) obtainable by polymerization of at least the following monomers:
(o1) at least one vinylic monomer containing no glycidyl group, and
(o2) at least one vinylic monomer containing a glycidyl group, for the improvement of the rheology and/or the dyeability of a composition comprising at least one terephthalate polyester (A), and at least one aliphatic-aromatic polyester (B) obtainable by polymerization of at least the following monomers:
m1) at least one aliphatic 1,ω-diol,
m2) at least one aliphatic 1,ω-dicarboxylic acid compound, and
m3) at least one aromatic 1,ω-dicarboxylic acid compound.

The examples which follow are intended to further illustrate the present invention, but without limiting the present invention thereto.

The invention claimed is:

1. A process for the preparation of a spinnable composition (sC) comprising the step (I) mixing
80 to 99.5% by weight of at least one terephthalate polyester (A),
0.49 to 19.9% by weight of at least one aliphatic-aromatic polyester (B) obtainable by polymerization of at least the following monomers:
(m1) at least one aliphatic 1,ω-diol,
(m2) at least one aliphatic 1,ω-dicarboxylic acid compound, and
(m3) at least one aromatic 1,ω-dicarboxylic acid compound,
0.01 to 3% by weight of at least one oligomer (C) obtainable by polymerization of at least the following monomers:
(o1) at least one vinylic monomer containing no glycidyl group, and
(o2) at least one vinylic monomer containing a glycidyl group, and
0 to 5% by weight of at least one additive (D),
wherein the % by weight are based in each case on the total weight of the components (A), (B), (C) and optionally-(D) mixed in order to obtain the spinnable composition (sC).

2. A process according to claim 1. wherein the at least one terephthalate polyester (A) is obtainable by polymeri.ration of at least the following monomers:
(n1) at least one aliphatic 1,ω-diol, and
(n2) at least one terephthalic acid compound.

3. A process according to claim 1, wherein the at least on terephthalate polyester (A) is at least one polyester selected from the group consisting of polyethylene terephthalate (PET), polytrimethylene terephthalate (PTT) and polybutylene terephthalate (PBT).

4. A process according to claim 1, wherein the at least one vinylic monomer containing no glycidyl group (o1) is a styrenic monomer and/or a (meth)acrylic monomer and the at least one vinylic monomer containing a glycidyl group (o2) is one or more of a glycidyl methacrylate and a glycidyl acrylate.

5. A process according to claim 1, wherein step (I) comprising the steps:
(Ii) mixing the at least one aliphatic-aromatic polyester (B) with the at least one oligomer (C) in order to obtain a first mixture (M1), and
(Iii) mixing the first mixture (M1) with the at least one terephthalate polyester (A) in order to obtain the spinnable composition (sC).

6. A spinnable composition (sC) obtained by the process according to claim 1.

7. A process for the preparation of polyester fibers (PF) comprising the steps of
(i) providing the spinnable composition (sC) according to claim 6, and
(ii) extruding the spinnable composition (sC) through at least one spinneret in order to obtain the polyester fibers (PF).

8. Polyester fibers (PF) obtained by the process according to claim 7.

9. A textile material (T) comprising polyester fibers (PF) according to claim 8.

10. A textile material (T) according to claim 9, wherein the textile material (T) is selected from the group consisting of apparel, carpets, curtains, covers or pieces of furniture, industrial textiles, cloths, wiping, yams, weaves, loop-drawn knits, loop-formed knits, nonwovens, fleeces and cushions.

11. A textile material (T) according to claim 9, wherein the textile material (T) is selected from the group consisting of sports and leisure clothing, yarns, carpets and nonwovens.

12. A process for the preparation of dyed polyester fibers (dPF), and/or dyed textile materials (dT) comprising the step of (a) contacting the polyester fibers (PF) according to claim 8 with at least one dye.

\* \* \* \* \*